US009251382B2

(12) United States Patent
Astigarraga et al.

(10) Patent No.: US 9,251,382 B2
(45) Date of Patent: Feb. 2, 2016

(54) MAPPING ENCRYPTED AND DECRYPTED DATA VIA KEY MANAGEMENT SYSTEM

(75) Inventors: Tara L. Astigarraga, Vail, AZ (US); Evren O. Baran, Highland, NY (US); Michael E. Browne, Staatsburg, NY (US); Christopher V. DeRobertis, Hopewell Junction, NY (US); Ashwin Venkatraman, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1392 days.

(21) Appl. No.: 11/961,015

(22) Filed: Dec. 20, 2007

(65) Prior Publication Data

US 2009/0164513 A1 Jun. 25, 2009

(51) Int. Cl.
*G06F 12/14* (2006.01)
*G06F 21/80* (2013.01)
*G06F 17/30* (2006.01)
*G06Q 10/10* (2012.01)

(52) U.S. Cl.
CPC ...................................... *G06F 21/80* (2013.01)

(58) Field of Classification Search
USPC ........... 707/E17.044, 708, 776, 791, 999.107; 713/171, 189–191; 380/259–260, 264, 380/277–286, 45–47
See application file for complete search history.

(56) References Cited

U.S. PATENT DOCUMENTS

| | | | |
|---|---|---|---|
| 5,224,166 A * | 6/1993 | Hartman, Jr. .................. | 713/190 |
| 5,933,498 A | 8/1999 | Schneck et al. | |
| 6,249,866 B1 * | 6/2001 | Brundrett et al. ............. | 713/165 |
| 6,327,660 B1 * | 12/2001 | Patel ............................. | 713/193 |
| 6,336,187 B1 | 1/2002 | Kern et al. | |
| 6,658,526 B2 | 12/2003 | Nguyen et al. | |
| 7,246,246 B2 * | 7/2007 | Kupka ..................... | G06F 21/10 380/241 |
| 7,398,351 B2 * | 7/2008 | Jaquette ................... | G06F 21/80 711/111 |
| 7,793,041 B2 * | 9/2010 | Jaquette et al. ............... | 711/111 |
| 7,864,478 B2 * | 1/2011 | Anna et al. ....................... | 360/69 |
| 2001/0019614 A1 * | 9/2001 | Madoukh ....................... | 380/277 |

(Continued)

OTHER PUBLICATIONS

Deltacrypt, Deltacrypt OneClick Encryption Software, Published by Tucows Inc.(Jul. 3, 2003) www.archive.org/details/tucows_241817_Deltacrypt_OneClick_Encryption_Software.

*Primary Examiner* — Azizul Choudhury
*Assistant Examiner* — Tariq Najee-Ullah
(74) *Attorney, Agent, or Firm* — Cantor Colburn LLP; Steven Chiu (57) ABSTRACT

A data processing system having a host computer including a key manager, a control unit connected to the host computer, a data storage unit (such as a tape drive) controlled by the control unit, and data storage medium for storing data thereon to be written to or read from by the data storage unit. The key manager stores a data structure having at least one record having a volume serial number, as start location, a length entry, and a key for encrypting and decrypting data on the data storage medium. A data storage medium (such as data tape) is mounted on the data storage unit, and a volume recorded on the tape is retrieved. The control unit retrieves the data structure from the key manager and matches the volume serial number recorded in the retrieved data structure with the volume serial number retrieved from the data storage medium. It they match, the control unit passes to the data storage unit, commands to turn on or turn off encryption dependent upon the location where data is written by the data storage unit onto the data storage medium, or to turn on or turn off decryption dependent upon the location where data is read by the data storage unit from the data storage medium.

20 Claims, 8 Drawing Sheets

(56) References Cited

U.S. PATENT DOCUMENTS

| | | | |
|---|---|---|---|
| 2002/0111133 A1 | 8/2002 | Wittkotter | |
| 2003/0070083 A1 | 4/2003 | Nessler | |
| 2003/0105852 A1* | 6/2003 | Das et al. | 709/223 |
| 2003/0221113 A1* | 11/2003 | Kupka | G06F 21/10 713/189 |
| 2005/0138110 A1* | 6/2005 | Redlich et al. | 709/201 |
| 2005/0273600 A1* | 12/2005 | Seeman | 713/160 |
| 2006/0143481 A1* | 6/2006 | Morten | 713/193 |
| 2006/0272027 A1 | 11/2006 | Noble | |
| 2007/0101442 A1* | 5/2007 | Bondurant | 726/34 |
| 2007/0113104 A1* | 5/2007 | Witt et al. | 713/193 |
| 2007/0276991 A1* | 11/2007 | Jaquette | G06F 21/80 711/111 |
| 2008/0061138 A1* | 3/2008 | Fisher et al. | 235/382 |
| 2008/0065676 A1* | 3/2008 | Hause | G06K 7/10316 1/1 |
| 2008/0066144 A1* | 3/2008 | Greco et al. | 726/1 |
| 2008/0165973 A1* | 7/2008 | Gavillan et al. | 380/278 |
| 2008/0228770 A1* | 9/2008 | Halcrow | G06F 17/30079 1/1 |
| 2008/0294906 A1* | 11/2008 | Chang et al. | 713/182 |
| 2009/0041234 A1* | 2/2009 | Gruba et al. | 380/42 |
| 2009/0049311 A1* | 2/2009 | Carlson et al. | 713/193 |
| 2009/0174965 A1* | 7/2009 | Greco et al. | 360/92.1 |
| 2009/0175451 A1* | 7/2009 | Greco et al. | 380/277 |
| 2009/0177314 A1* | 7/2009 | Greco et al. | 700/218 |
| 2010/0046108 A1* | 2/2010 | Anna et al. | 360/53 |

* cited by examiner

FIG. 1

| VOLSER 205 | START 210 | LENGTH 215 | KEY 220 |
|---|---|---|---|
| VOLSER 225 | START 230 | LENGTH 235 | KEY 240 |
| ⋮ 245 | ⋮ 250 | ⋮ 255 | ⋮ 260 |

FIG. 2

| VOLSER 305 | START 310 | LENGTH 315 | KEY 320 |
|---|---|---|---|

FIG. 3

| START | LENGTH |
| --- | --- |
| 405 | 410 |
| START | LENGTH |
| 415 | 420 |
| ⋮ 425 | ⋮ 430 |

MAPPING ENCRYPTED AND DECRYPTED DATA VIA KEY MANAGEMENT SYSTEM

FIELD OF THE INVENTION

This invention relates to writing data to and reading data from a storage medium, and particularly to writing encrypted data to and reading encrypted data from a storage medium such as tape.

BACKGROUND OF THE INVENTION

The current method of doing hardware tape encryption, and in the future, disk data encryption, requires that the entire volume be encrypted. This limitation poses a few problems since in many cases users will not require the entire data on a tape volume to be encrypted.

One of these problems is, when trying to recover complete systems where the tape device or the disk device needs to be IPL'd (Initial Program Load) or booted, the current procedure will require a non-encrypted tape or disk media device to be IPL'd or booted first to get enough of the operating system up and running to be able to interact with the key management system.

One drawback of the prior art is the requirement of having both an encrypted and non-encrypted tape volume. It is desirable to have even operating system data (such as supervisor passwords) to be encrypted. Additionally, media devices in servers today cannot IPL or boot an encrypted bootstrap program.

Another problem that this leads to is the fact that the users are required to purchase and manage more storage media devices, since the users don't have the ability to store both encrypted and non-encrypted data on the same storage device. One solution to this problem is just encrypting all data.

A drawback of this solution is that both encryption and decryption take time and may affect performance. It is desirable to only encrypt data that needs to be encrypted and not an entire volume each time.

U.S. Pat. No. 5,993,498 issued Aug. 3, 1999 to Schneck et al. for SYSTEM FOR CONTROLLING ACCESS AND DISTRIBUTION OF DIGITAL PROPERTY discloses a system for controlling access to data in which portions of the data are protected. FIGS. 20(b) and 21(b) show packaged data structures having non-secure regions 120, 122, 124 and an encrypted ancillary information region 126.

U.S. Pat. No. 6,336,187 B1 issued Jan. 1, 2002 to Kern et al. for STORAGE SYSTEM WITH DATA-DEPENDENT SECURITY discloses a host-independent storage facility that provides data-dependent security by storing a storage key in association with a storage region. In response to an application allocation command, the host issues a set-access-key command that identifies the protection type, the storage region to be protected, and the reference key to be used by the controller for gaining access to the associated region. Table 1 shows a storage use map that includes storage access region, reference access key, and operation parameter (write, read/write, no security). Allocated storage regions include disk sectors, disk tracks, disk "extents", volumes, address ranges, blocks, tape tracks, files, datasets, etc. (col. 7/23-29).

U.S. Pat. No. 6,658,526 B2 issued Dec. 2, 2003 to Nguyen et al. for NETWORK ATTACHED VIRTUAL DATA STORAGE SUBSYSTEMS discloses a network attached virtual data storage subsystem in which the networked storage manager (NSM) manages the allocation, configuration and security; the NSM controls file access or volume access as well as implementing data encryption/decryption within the control blocks.

US Patent Application Publication US 2002/0111133 A1 published Aug. 15, 2002 by Wittkotter for DATA PROCESSING APPLIANCE discloses a key management system for a data file system in which each file of a volume data file has an individual key. Access to a selected file requires both the file key and the volume key.

US Patent Application Publication US 2003/0070083 A1 published Apr. 10, 2003 by Nessler for METHOD AND DEVICE FOR ENCRYPTION/DECRYPTION OF DATA ON MASS STORAGE DEVICE discloses a hard disk device that is divided into several independent isolated storage areas. A master boot record (MBR) is stored in one of the independent isolated storage areas; each of the remaining areas stores encrypted data where each area uses a different, independent key.

US Patent Application Publication US 2006/0272027 A1 published Nov. 30, 2006 by Noble for SECURE ACCESS TO SEGMENT OF DATA STORAGE DEVICE AND ANALYZER discloses a data storage device that can include both a secure portion and an insecure portion. The storage device is partitioned into at least two partitions. The insecure portion may be traditionally partitioned and store encrypted data as desired (Par. 33). There can be multiple secure portions and multiple insecure portions of the data storage device (pars. 41 and 44).

*Deltacrypt OneClick Encryption Software*, published on Tucows Inc. (Jul. 3, 2003), www.archive.org/details/tucows_241817_Deltacrypt_OneClick_Encryption_Software describes a file encryption program with RSA protected keys. The user is able to encrypt any file format without volume restrictions.

SUMMARY OF THE INVENTION

A primary object of this invention is to provide users with the ability of encrypting parts of a volume rather than forcing them to encrypt the entire volume when they only need a part of the data on the volume encrypted.

Another object of the present invention is to provide changing the mapping of whether a volume is encrypted to whether parts of a volume are encrypted in the key manager.

Another object of the present invention is to provide both secure and insecure data to be stored on the same volume requiring a smaller number of tapes needed to archive a particular set of data.

Another object of the invention is to allow users to save when purchasing storage medium devices and on costs due to management of these devices.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
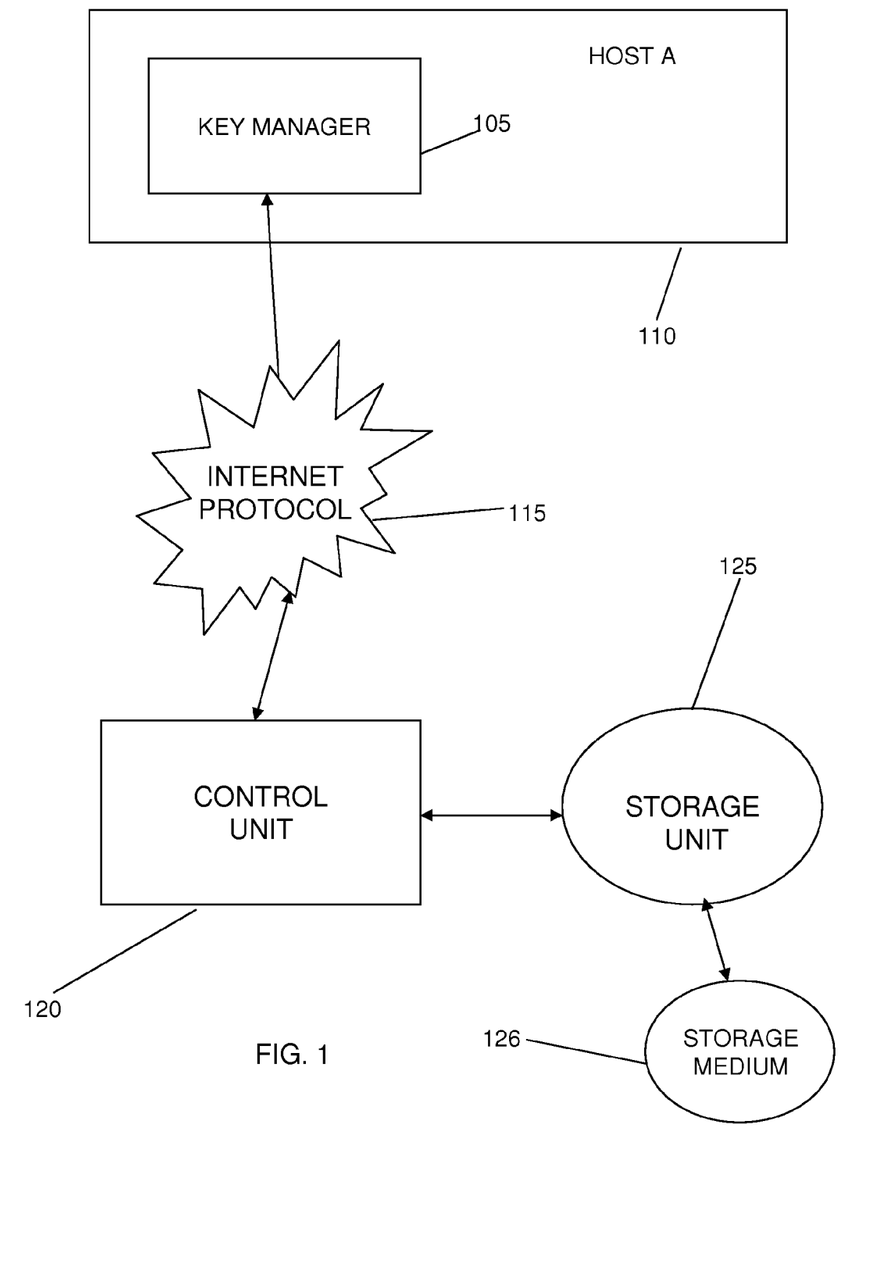
FIG. 1 depicts the connections and flow for key management in hardware tape encryption product design.

FIG. 1 depicts a data processing system having a host A 110 having a key manager 105 which stores the ranges of volume serial numbers and whether they are encrypted on not encrypted. A tape control unit 120 is connected by an IP connection 115 to the key manager 105. The control unit 120 controls a data storage unit 125, in this case a tape drive, which reads from and writes to a storage medium 126, in this case data tape. The data storage unit 125 includes an encryption facility for encrypting and decrypting the data on tape 126.

Figure 2:
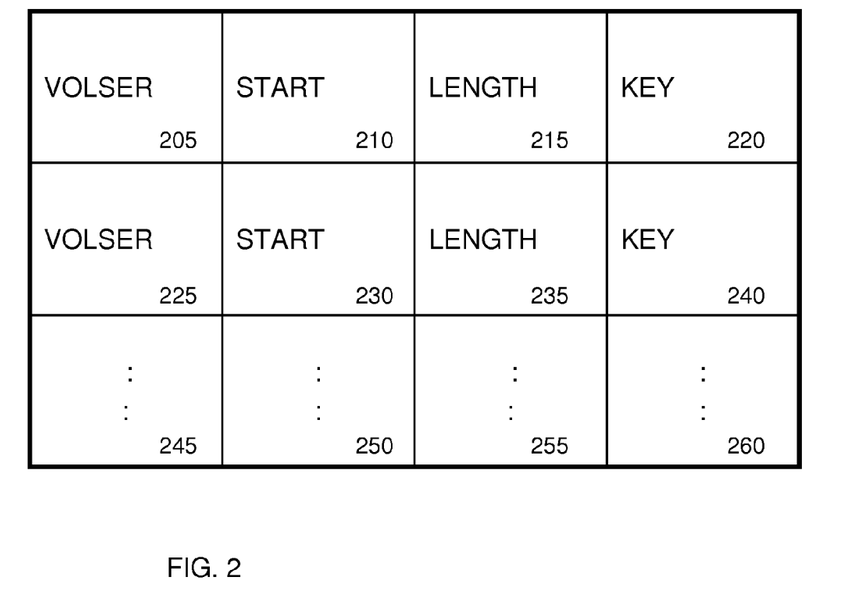
FIG. 2 is an example of an embodiment of a key map to record tape positions that are or are not encrypted.
Figure 3:
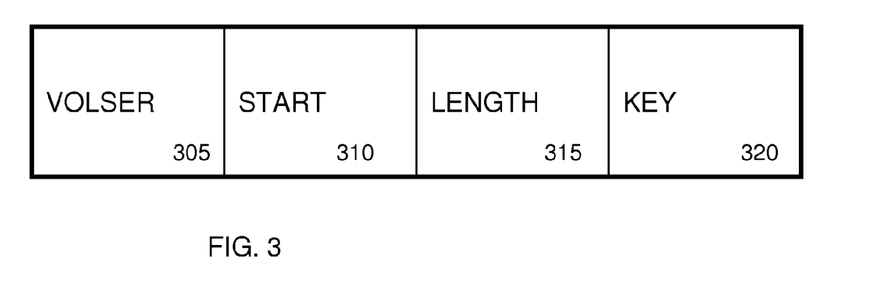
FIG. 3 is one embodiment of a data structure used to populate a key map.

FIG. 2 illustrates a key map data structure stored and used by the key manager 105. The key map data structure includes a plurality of data records, each data record having a serial number of the storage medium (VOLSER) 205, 225, . . . 245. The data records also include a start location or address 210, 230, . . . 250, a length parameter, 215, 235, . . . 255, and a key 220, 240, . . . 260. As is well known, the keys are used to encrypt and decrypt the data on the data storage medium 126. As illustrated in FIG. 3, the individual data record includes a volume serial number VOLSER 305, a start address 310 which is the address of the position on the storage medium 125 to start encryption/decryption, a length field 315 which indicates how long to perform encryption/decryption, and a key for use in the encryption/decryption of data on the storage medium 126. Encryption/decryption using keys is well understood, and will not be described further.

Figure 4:
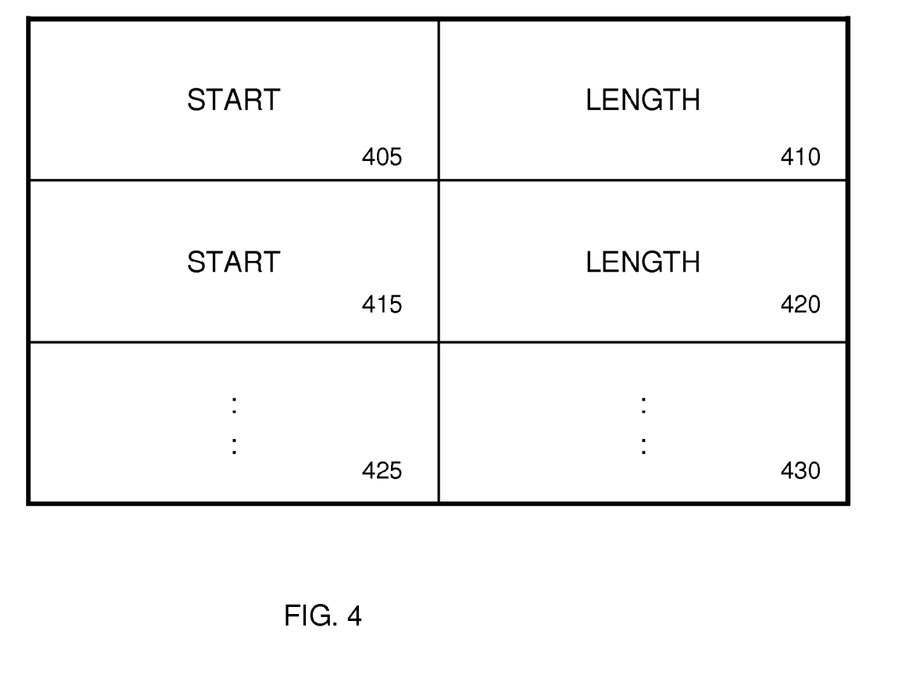
FIG. 4 depicts the listing of the tape positions for when to turn encryption on and off.

FIG. 4 illustrates the listing of the tape positions for controlling when to turn encryption on and off. Each of the start fields 405, 415, . . . 25 indicates where encryption is to start, and the length field 410, 420, . . . 430 indicates for how long the encryption is to be done. Ranges of volume serial numbers are either encrypted or not encrypted, as desired. Using the information of FIGS. 2 and 3, the control unit 120 prepares the listing of FIG. 4 for the tape drive 125 so that the tape drive 125 encrypts the data on the storage medium 126 in accordance with the list of FIG. 4.

Figure 5:
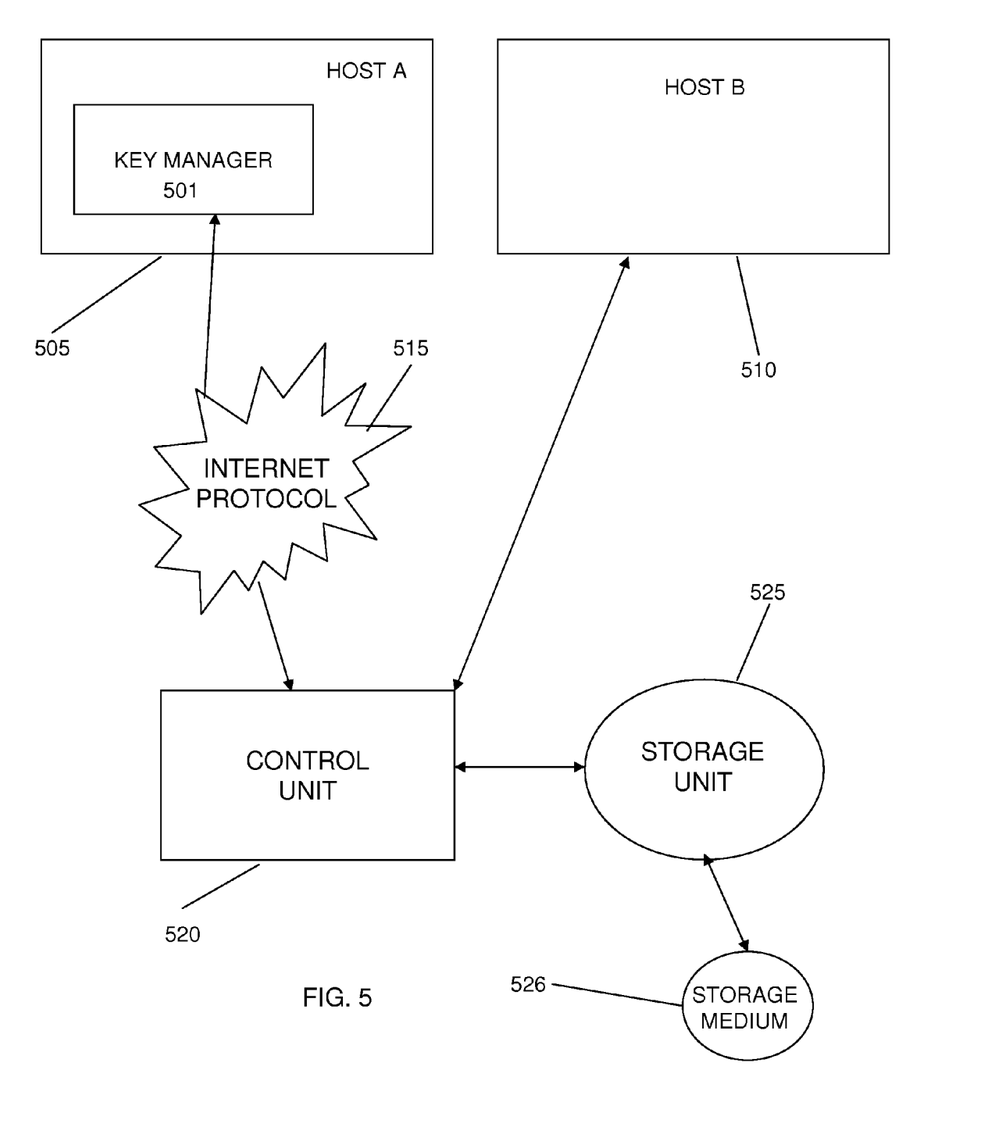
FIG. 5 depicts an embodiment of the present invention used to read data from the media device.

FIG. 5 is an illustration of an embodiment of reading data. The system of FIG. 5 includes a host A machine 505, and host machine 510, a key manager 501 in host A 505, an internet protocol interface (IP) 515 connected to the key manager 501, a control unit 520 connected to the IP 515 and host B 510, a storage unit such as a tape drive 525 connected to the control unit 520, and a storage medium such as a data tape 526 connected to the storage unit 525.

Figure 7:
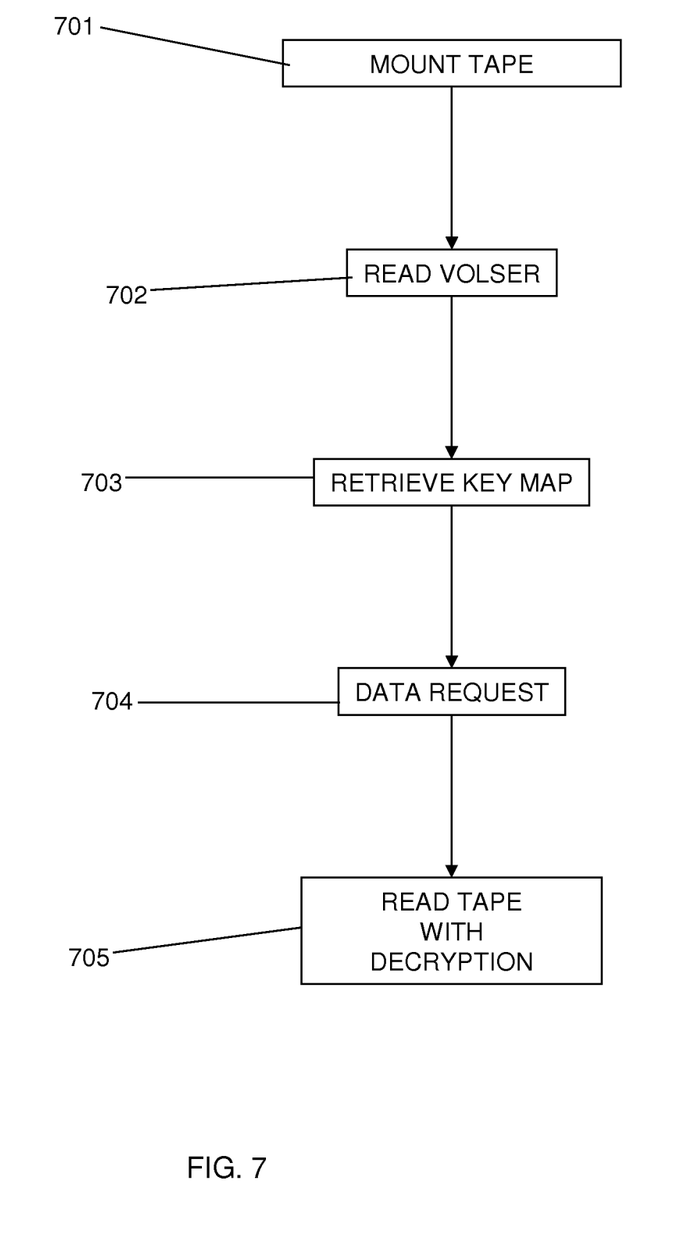
FIG. 7 is a flow diagram of a read operation.

FIG. 7 presents a flowchart of a read operation by the system of FIG. 5. A read operation is conducted by mounting a tape volume 526 on the tape drive 525 (701). The tape control unit 520 then reads the VOLSER (volume serial number) of the mounted tape 526 (702). The control unit 520 sends the VOLSER information with a request to the key manager 501 to get the appropriate encryption key and key map as shown in FIG. 2 (703). The control unit 520 then receives a command from host B machine 510 asking for data that is on the tape 526 (704). The control unit passes to the tape drive 525, the command to read the tape 526, including the command string and tape positions to turn decryption on and off in accordance with the key map of FIG. 2 and in accordance with the list shown in FIG. 4. The tape drive unit 525 then turns decryption on and off, as instructed (705).

Figure 6:
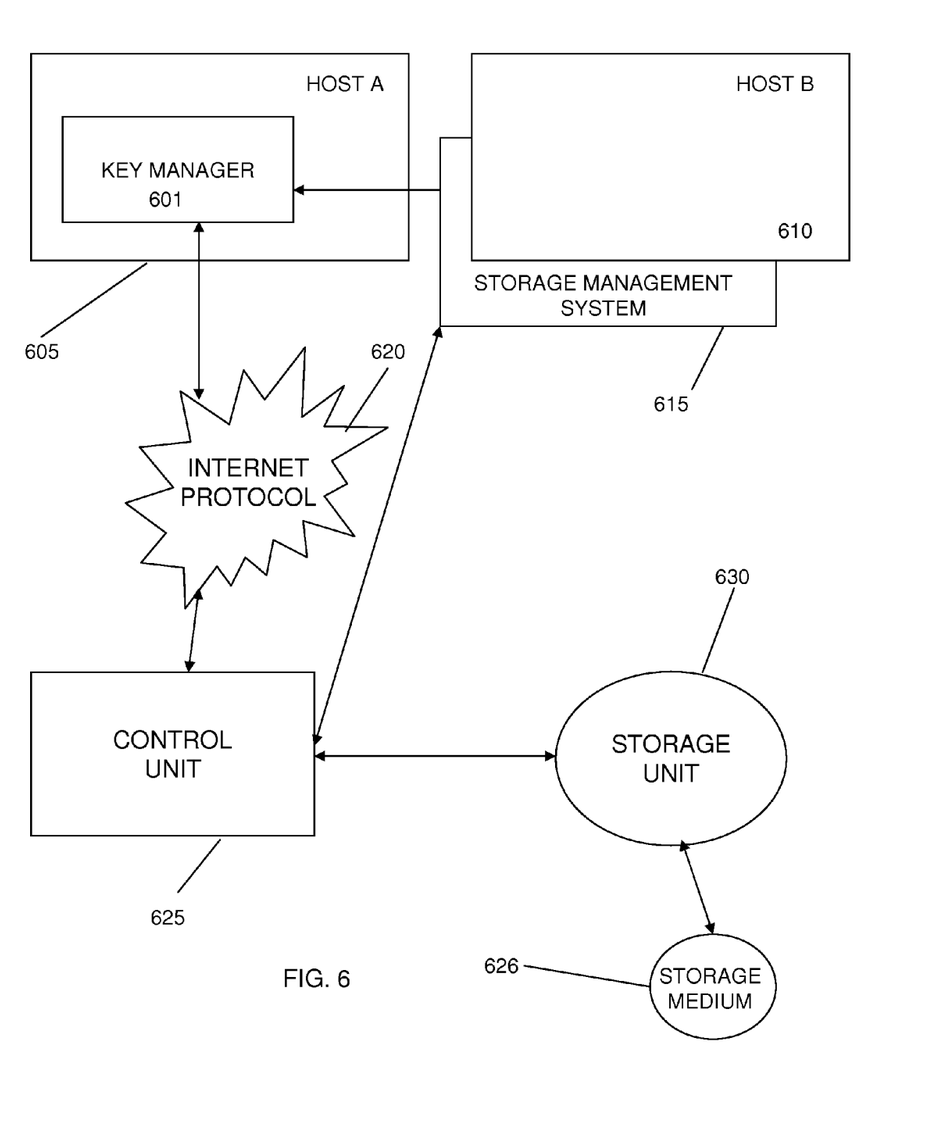
FIG. 6 depicts an embodiment of the present invention used to write data to the media device.

FIG. 6 illustrates an embodiment illustrating writing data to a new a new tape. The system of FIG. 6 includes a host A machine 605 having a key manager 601, and a host B machine 610 having a storage management system 615 such as Tivoli Storage Manager (TSM) available from International Business Machines. The key manager 601 is connected to an internet protocol interface (IP) 620 which is connected to a control unit 625. The control unit 625 is also connected to the TSM 615 and controls a storage unit 630 such as a tape drive, which writes to a storage medium 626, in this case a data tape.

Figure 8:
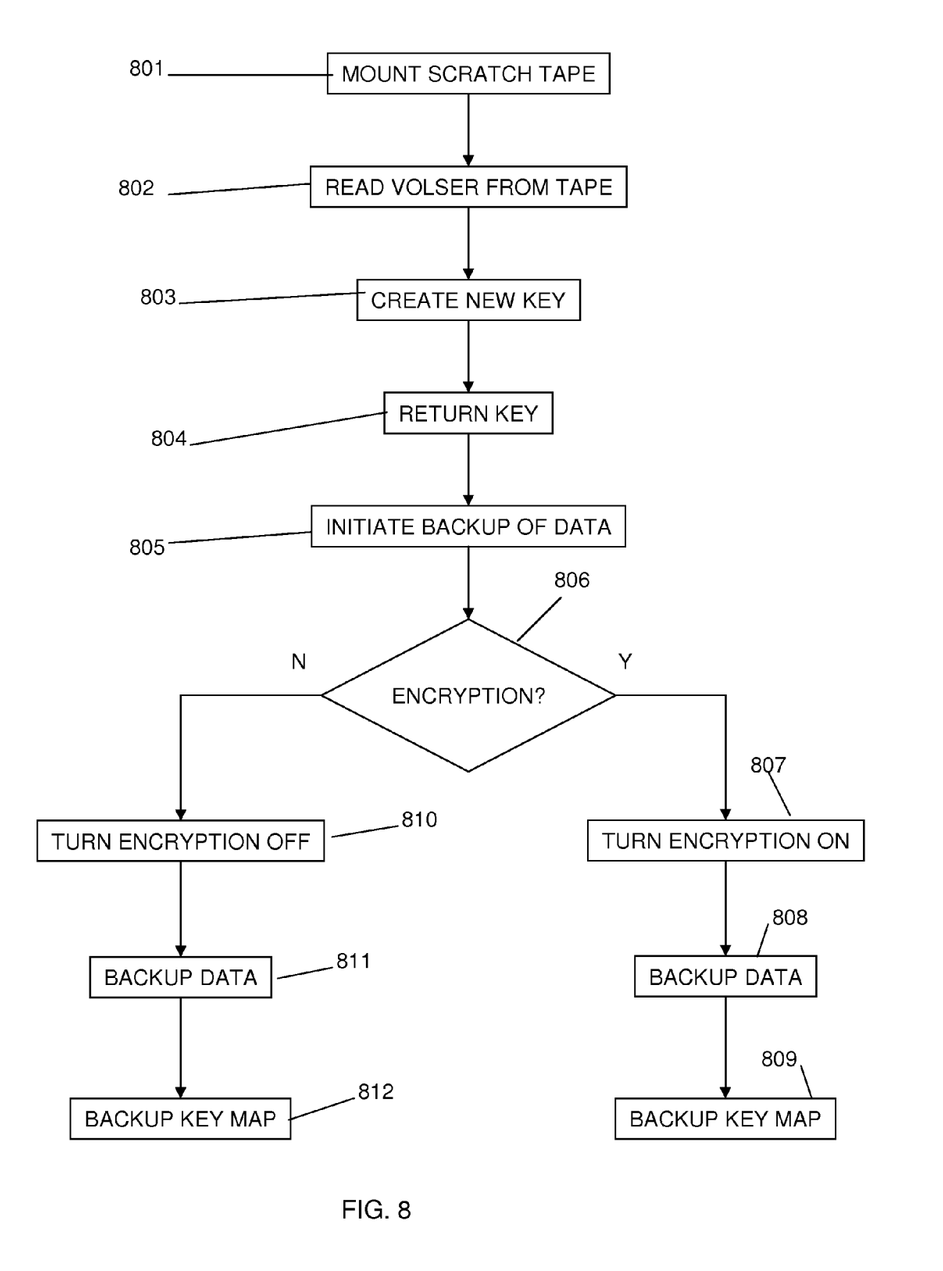
FIG. 8 is a flow diagram of a write operation to a new tape.

FIG. 8 illustrates a writing of data to a new tape operation by the system of FIG. 6. In the writing to a new tape embodiment, a scratch tape is mounted on the tape drive unit 630 (801), and the tape control unit 625 reads the VOLSER on the tape (802). The control unit 625 sends a request to the key manager 601 with the VOLSER read from the tape 626 with a request to the key manager 601 to create a new key (803). The key manager 601 returns the key to the control unit, and the tape control unit 625 passes the key to the tape drive 630 (804). The storage management system TSM 615 initiates the backup of data (805). The TSM 615 determines via its database whether the data to be written to the tape 626 needs to be encrypted (806). The encrypt indicator, for instance a bit, is passed to the control unit 625 as part of the data that is to be backed up to the tape. If the data is to be encrypted, the TSM 615 sends a special command to the control unit 625 to command the tape drive 630 to turn encryption on (807). The TSM 615 then backs up the data to the tape 626 (808). The TSM 615 then updates the key manager 601 with the map of the tape positions that are encrypted (809). It will be understood that updates may be directly from host B 610 to host A 605 as shown, or may be through the internet protocol 620.

If TSM determines via its database, that the data does not need to be encrypted (806), TSM 615 sends a special command to the tape drive 630 to turn encryption off (810). The TSM 615 then backs up data to the tape 626 (811). The TSM 615 then updates the key manager 601 with a map of tape positions that are not encrypted (812).

Figure 9:
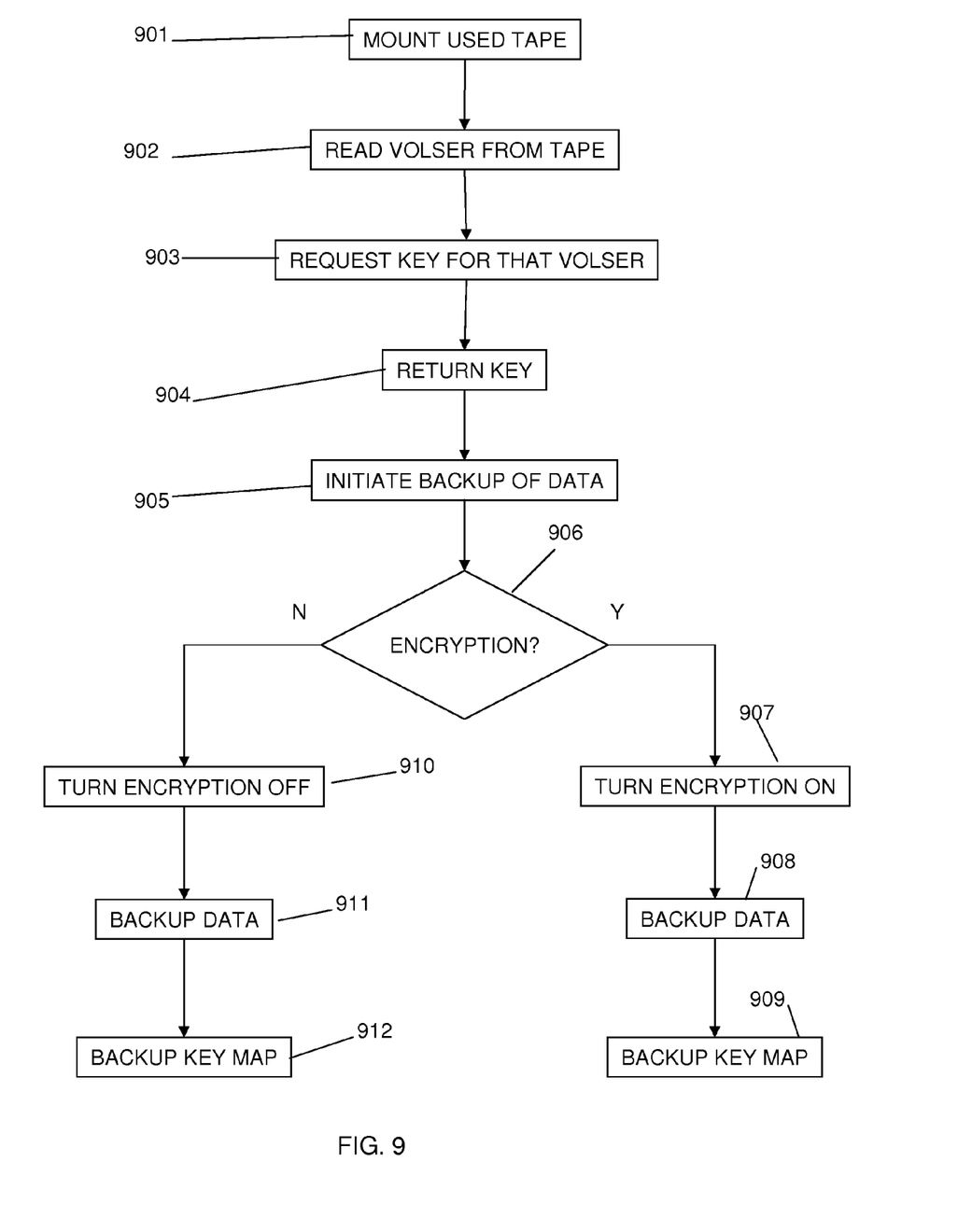
FIG. 9 is a flow diagram of a write operation to a used tape.

FIG. 9 illustrates writing to a used tape operation by the system of FIG. 6. In the writing to a used tape embodiment, a used tape is mounted on the tape drive 630 (901). The tape control unit 625 reads the VOLSER on the tape 626 (902). The control unit 625 then sends a request to the key manager 601 with the VOLSER to retrieve the key used for encryption and decryption of this volume (903). The key manager 601 returns that key to the tape control unit 625, and the tape control unit passes that key to the tape drive 630 (904). The storage system TSM 615 initiates the backup of data (905). The storage management system TSM 615 determines via its database whether the data needs to be encrypted (906). If the data is to be encrypted, the TSM 615 sends a special command to the control unit 625 to command the tape drive 630 to turn encryption on (907). The TSM 615 then backs up the data on tape 626 (908). The TSM 615 then updates the key manager 601 with the map of tape positions that are encrypted such as with the map shown in FIG. 2 (909).

If the TSM 615 determines via it database that the data does not need to be encrypted (906), the TSM 615 sends a special command to the tape control unit to command the tape drive 630 to turn encryption off (910). The TSM 615 then backs up the data to the tape 626 (911). The TSM then updates the key manager 601 with the map of tape positions that are not encrypted (912).

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A data processing system comprising:
   a host computer including a key manager;
   a control unit in communication with the key manager, wherein the control unit is distinct from the host computer;
   a data storage unit controlled by the control unit;
   a data structure stored on the host computer, the data structure configured to map the encryption of data stored on a non-transitory data storage medium readable and writable by the data storage unit; and
   wherein the data structure comprises:
      at least one volume serial number entry comprising a volume serial number of the data storage medium;
      at least one location entry comprising a location address on the data storage medium of data to be accessed by the data storage unit;
      at least one length entry comprising the length of the data to be accessed from the data storage medium, the length of the data indicating a size of the data to be encrypted; and
      at least one key entry associated with said volume serial number, said location entry, and said length entry, said at least one key entry for recording a key to be used to encrypt and decrypt data stored at the associated location address on the data storage unit, and
   wherein the data structure is not stored on the storage unit.

2. The data processing system according to claim 1 wherein the at least one volume serial number entry, the at least one location entry, the at least one length entry, and the at least one key entry of the data structure are transferred from said key manager to said control unit to be used by said control unit to pass to said data storage unit to turn on encryption of data being written to said data storage medium or to turn on decryption of data being read from said data storage medium.

3. The data processing system according to claim 1 wherein said associated volume serial number, location, and key are arranged in a record.

4. In a data processing system comprising a host computer including a key manager, a control unit connected to said host computer, a data storage unit controlled by said control unit, and a non-transitory data storage medium for storing data thereon to be written to or read from by said data storage unit, a method comprising:
   storing, by said host computer, a data structure having at least one record having a volume serial number entry comprising a volume serial number of a first data storage medium, a start location comprising a location address on the first data storage medium of data to be accessed by the data storage unit, a length entry comprising the length of the data to be accessed from the first data storage medium, the length of the data indicating a size of the data to be encrypted, and a key for encrypting and decrypting data on said first data storage medium;
   mounting, by said data storage unit, a data storage medium and retrieving, by said data storage unit, a volume serial number recorded on the data storage medium;
   retrieving, by said control unit, said data structure from said key manager;
   responsive to matching the volume serial number recorded in said retrieved data structure with the volume serial number retrieved from said data storage medium, passing, by said control unit, to said data storage unit, commands to turn on or turn off encryption dependent upon the location address where data is written by said data storage unit onto said data storage medium, or to turn on or turn off decryption dependent upon the location address where data is read by said data storage unit from said data storage medium,
   wherein the data structure is not stored on the storage unit.

5. The method of claim 4 wherein writing data to said data storage medium is controlled by a storage management system on a host machine in said data processing system, and further comprising:
   updating by said storage management system, the data structure of said key manager by storing the volume serial number of the data storage medium, the location and length of the data written on the data storage medium and the key for encrypting/decrypting data written on the data storage medium.

6. The method of claim 5 wherein said storage management system is on a different host computer from the host computer having the key manager.

7. The method of claim 6 wherein said storage management system is the Tivoli Storage Manager.

8. The method of claim 4 wherein the control unit is connected to the host computer having the key manager by an internet protocol such that a network is between said host computer and said control unit.

9. The method of claim 4 further comprising:
   retrieving by said control unit, the data structure of said key manager;

creating a list having at least one starting location and length of data to be encrypted; and passing said list to said data storage unit with commands to turn on or off, encryption or decryption of data on said data storage medium in accordance with said list.

10. The method of claim 4 further comprising turning said encryption/decryption is controlled by an indicator.

11. The method of claim 10 wherein said indicator is a bit.

12. The method of claim 4 wherein said data storage unit is a tape drive.

13. A data processing system comprising:

a host computer comprising; a key manager;

a control unit connected to said host computer and configured to communicate with said key manager;

a data storage unit controlled by said control unit;

a non-transitory data storage medium readable and writable by said data storage unit, said data storage medium having recorded thereon a volume serial number;

wherein the key manager comprises a data structure established said data structure having at least record having a volume serial number entry comprising a volume serial number of first data storage medium, a start location comprising a location address on the first data storage medium of data to be accessed by the data storage unit, a length entry comprising the length of the data to be accessed from the first data storage medium, the length of the data indicating a size of the data to be encrypted, and a key for encrypting and decrypting data on said first data storage medium;

wherein said control unit retrieved said data structure from said key manager with said control unit and matches the volume serial number recorded in said retrieved data structure with the volume serial number retrieved, by said data storage unit, from said data storage medium;

wherein responsive to said matching, said control unit passes to said data storage unit, commands to turn on or turn off encryption dependent upon the location address where data is written by said data storage unit onto said data storage medium, or to turn on or turn off decryption dependent upon the location address where data is read by said data storage unit from said data storage medium, and wherein the data structure is not stored on the storage unit.

14. The data processing system of claim 13 further comprising:

a storage management system on a host machine for writing data to said data storage, and for updating the data structure of said key manager by storing the volume serial number of the data storage medium, the location and length of the data written on the data storage medium and the key for encrypting/decrypting data written on the data storage medium.

15. The data processing system of claim 14 further comprising a second host computer, and said storage management system is on a different host computer from the host computer having the key manager.

16. The data processing system of claim 14 further comprising an internet protocol between said control unit and said host computer having the key manager such that a network is between said host computer and said control unit.

17. The data processing system of claim 13 wherein said control unit:

retrieves the data structure of said key manager, creates a list having at least one starting location and length of data to be encrypted, and passes said list to said data storage unit with commands to turn on or off, encryption or decryption of data on said data storage medium in accordance with said list.

18. The data processing system of claim 13 further comprising an indicator for turning said encryption/decryption on and off.

19. The data processing system of claim 18 wherein said indicator is a bit.

20. The data processing system of claim 13 wherein said data storage unit is a tape drive.

* * * * *